J. HRIBAR.
CLUTCH MECHANISM.
APPLICATION FILED MAR. 13, 1916.
1,228,673.
Patented June 5, 1917.
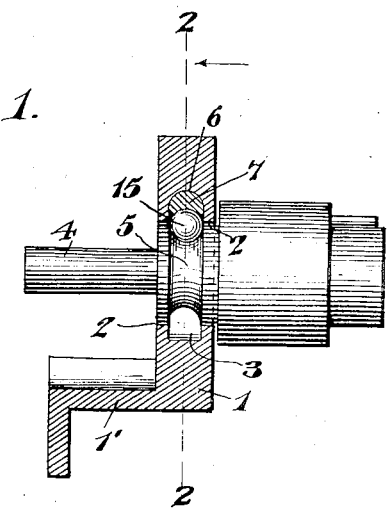
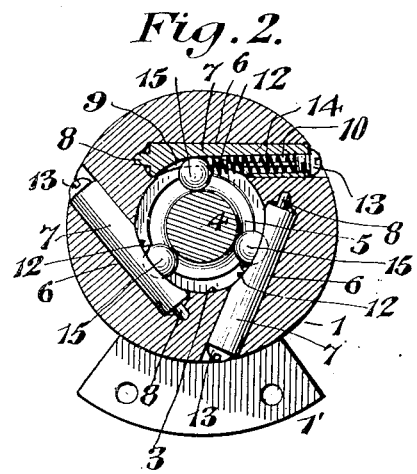
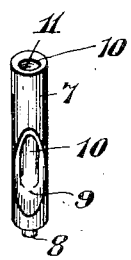
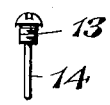
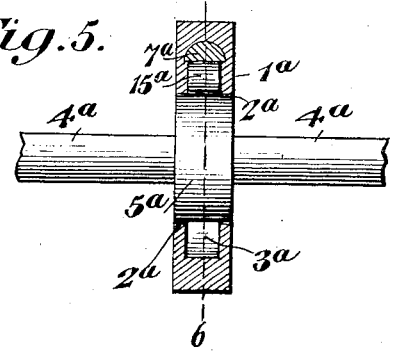
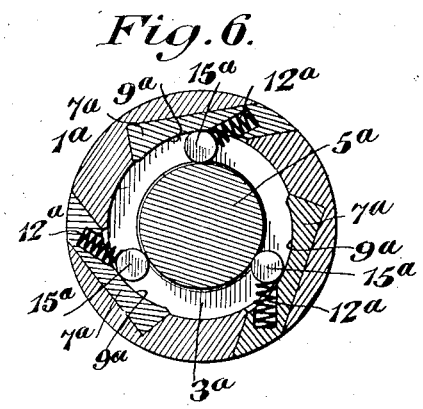
WITNESSES
Jas. K. McCathran
H. T. Chapman
Joe Hribar, INVENTOR
BY E. G. Siggers
ATTORNEY

UNITED STATES PATENT OFFICE.

JOE HRIBAR, OF WAUKEGAN, ILLINOIS.

CLUTCH MECHANISM.

1,228,673. Specification of Letters Patent. Patented June 5, 1917.

Application filed March 13, 1916. Serial No. 83,896.

*To all whom it may concern:*

Be it known that I, JOE HRIBAR, a citizen of the United States, residing at Waukegan, in the county of Lake and State of Illinois, have invented a new and useful Clutch Mechanism, of which the following is a specification.

This invention has reference to brake mechanism and its object is to provide means whereby a shaft may be free to turn in one direction and automatically lock against rotation in the other direction, with the means whereby such one way rotation is made effective greatly reducing the frictional resistance to the free rotation of the shaft in said one direction, but automatically clutching the shaft when the attempt is made to reverse the direction of rotation.

The invention is applicable to many uses where such one-way rotation is desirable, and is particularly useful in connection with spring motors such as are used in piano players, victrolas, or other sound-reproducing machines, and the like.

The invention comprises a suitable structure constituting a journal bearing and a shaft mounted therein, the shaft usually, though not necessarily, being the rotatable member. The journal bearing, which for convenience of description will be considered as a stationary member without necessary limitation thereto, contains a circular series of balls or rollers engaging the shaft and seating therein to an extent sufficient to prevent longitudinal displacement of the shaft, whereby the balls become a lock for the shaft as to such longitudinal displacement. Each ball or roller is under the control of a pin inserted tangentially in the journal bearing in a manner to intersect a ball or roller race in the journal bearing. Each pin contains a seat for the ball or roller so related thereto as to cause the cramping of the ball or roller against its seat in the pin and against the shaft when the shaft is turned in one direction, and releasing the shaft when the latter is turned in the other direction. To maintain the ball or roller toward the cramping end of the seat in the pin, each pin carries a spring engaging the ball or roller and urging it in the named direction. To prevent buckling of the spring a retaining screw is provided and the screw carries an axially elongated pin extending through the spring, which is usually a helical spring, for the greater portion of its length, but stopping short sufficiently of the end of the spring to prevent interference with the ball or roller.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of a shaft or rotary member with a journal bearing in diametric section, said journal bearing and shaft embodying the present invention.

Fig. 2 is a section on the line 2—2 of Fig. 1.

Fig. 3 is a perspective view of one of the ball-retaining pins.

Fig. 4 is an elevation of one of the spring-retaining screws.

Fig. 5 is a section similar to that of Fig. 1, but showing an arrangement where rollers instead of balls are employed.

Fig. 6 is a section on the line 6—6 of Fig. 5.

Referring to the drawings, there is shown a member 1 provided with a bracket 1' which may be considered as any suitable means for securing the member 1 to some part of a machine. In the particular construction illustrated in the drawings, the member 1 is in the form of a disk of suitable diameter and thickness provided with a passage 2 axially therethrough and with a race-way 3 concentric with the axis of the disk and about midway between the side walls thereof, the passage 2 also being concentric with the axis of the disk.

There is also shown a shaft 4 which extends axially through the passage 2 in free but snug fitting relation thereto, and this shaft where located within the disk has a circumferential groove 5 produced therein, such groove being generally, though not necessarily, of approximately semi-circular cross-section. The groove 5 is a companion or coöperating ball race-way with the race-way 3, which latter has its outer peripheral wall preferably, though not necessarily, flat.

Entering the journal disk 1 are elongated sockets 6 usually of cylindrical shape because of ease of manufacture. These passages intersect the race-way 3 and are substantially tangential to the walls of the passage 2. The tangential sockets 6 are, in the particular showing of the drawings, three in number and are equi-distantly spaced, and while three sockets are ample for the purposes of the present invention, especially in small structures, the invention is not confined to such number because a greater number of sockets may be employed.

Lodged in each socket is a pin 7 which, because of the cross-sectional shape of the socket, is of cylindrical conformation. To hold the pin 7 in a substantially centralized position in the socket without the pin binding, each pin has at one end an axially extended stud 8, the socket 6 being suitably bored at the closed end for the reception of the extension 8. On one side each pin 7 is formed with a recess 9 having a longitudinal curvature on a shorter radius than the curvature of the outer peripheral wall of the race-way 3, so that the curvature of the recess 9 longitudinally of the pin is about a center between the longitudinal axis of the pin and the axis of the disk 1, or of the shaft 4 which is concentric therewith. The recess 9 is curved laterally of the length of the pin on an axis approximately similar to the cross-sectional curvature of the groove 5. Extending lengthwise of the pin 7 and entering the pin from the end remote from the stud 8 is a bore 10 having a screw-threaded portion 11 at the mouth of the bore. The bore 10 opens into that end of the recess 9 remote from the stud 8 and is designed to house a spring 12 which may be in the form of an ordinary helical spring. A screw 13 with an axially extended reduced stem 14 is applied to the threaded end 11 of the bore 10 to retain the spring 12 in the bore with the reduced stem 14 extending longitudinally of the spring.

Lodged in the recess 9 of each pin and entering the groove 5 is a ball 15, being urged toward that end of the recess 9 adjacent to the stud 8 by the spring 12. The relation of what may be termed the inner end of the recess 9, that is, the end toward the stud 8, to the groove 5 is such that the ball cramps between the bottom of the groove 5 in the shaft 4 and the inner end of the recess 9 when the attempt is made to turn the shaft in a direction to roll the ball toward such inner end of the recess 9. In Fig. 2 such a rotative impulse imparted to the shaft 9 would be in a counter-clockwise direction, the ball being normally urged in the same direction by the spring 12. The result is that any attempt to turn the shaft in a counter-clockwise direction as viewed in Fig. 2 is at once prevented by the cramping action of the balls 15 in the race-way. If, however, the attempt be made to turn the shaft in the opposite or clockwise direction, the balls are at once moved away from the cramped or clutching position into a freer portion of the race-way, the springs 12 then yielding to a small extent. As soon as the balls move out of the cramped or clutching position, the shaft is free to rotate and is supported wholly by the balls.

In the small structures to which the invention is usually applied the number of clutching balls employed may be limited to three disposed about 120° apart, and thereby effectively centering the shaft, so that at no place does it come into rubbing contact with the journal bearing surfaces.

The pins need no special fastening devices other than a relatively snug fit in their respective sockets, since the only forces tending to move the pins lengthwise in their sockets are the clutching forces which act on the pins to seat them more firmly in the sockets. Forces which would be liable to expel the pins are only rolling forces exerted through the freely rotating balls, and these forces are insufficient to disturb the ordinary fit of the pins, so that the pins may be withdrawn whenever desired by removing the screws 13 and applying a suitable tool to the threaded ends of the bores 10 and pulling the pins out of their sockets, the balls then finding escape into the race-ways. Of course, some suitable fastening means in addition to frictional engagement may be employed to hold the pins fixedly in the sockets.

The balls by bridging the space between the shaft and the race-way 3 form an effective lock against longitudinal displacement of the shaft to any material extent, so that the shaft is maintained in its bearings solely by the balls, which latter act as effective clutches against rotation of the shaft in one direction and provide friction reducing bearings for the shaft when the latter is turned in the opposite direction.

In the structure shown in Figs. 5 and 6 there is a disk-like journal bearing 1$^a$ similar to the journal bearing 1 of the other figures, and a shaft 4$^a$ with a cylindrical member 5$^a$ extending through an opening 2$^a$ axially through the journal bearing 1$^a$. A race-way 3$^a$ is formed in the member 1$^a$ and is similar to the race-way 3 of Fig. 1. The race-way 3$^a$ is entered by pins 7$^a$ each with a longitudinal recess 9$^a$ where the pins enter the race-way, the longitudinal curvature of the recess 9$^a$ being eccentric to the axis of rotation of the shaft. Lodged in the race-way 3$^a$ are anti-friction rollers 15$^a$ urged in the clutching direction by springs 12$^a$ seated in the respective pins 7$^a$.

The structure of Figs. 5 and 6 is in essential particulars similar to the structure of Fig. 1 and associated figures, except that rollers are substituted for balls, and some of the advantages of the ball bearings are omitted. However, the clutching action of the rollers preventing rotation of the shaft in one direction and the friction reducing bearing function of the rollers with respect to rotation of the shaft in the other direction are the same in the structure of Figs. 5 and 6 as occurs in the structure of Fig. 1 and associated figures.

The invention has the advantage of simplicity and cheapness of construction, with the further advantage of providing a one-way clutch, which on rotation of the rotary member in the opposite direction serves the function of a friction reducing bearing whether of the ball or roller type.

The member 1 or 1ª has been described as a disk, but it will be understood that it may be a block of any suitable conformation and may be formed of one or more pieces, its function being that of a journal bearing.

What is claimed is:—

1. In a brake mechanism, the combination with a shaft, of a journal bearing having a passage for the shaft with a race way in the journal bearing concentric with and opening into the passage, said journal bearing having a plurality of sockets entering the race way, pins each provided with a recess and adapted to be received in the sockets, and rotatable members in the recesses in position to engage the shaft within the passage for the shaft in the journal bearings, and said recesses being so arranged in relation to the shaft as to cause the rotatable members to clutch the shaft when the latter is rotated in one direction and to free the shaft when the latter is rotated in the other direction, said rotatable members being in number and so disposed about the shaft as to constitute a friction reducing bearing for the shaft on its rotation in a direction opposed to that causing the clutching of the shaft in the journal bearing.

2. In a brake mechanism, the combination with a shaft, of a journal bearing having a passage for the shaft with a race way in the journal bearing concentric with and opening in the passage and said journal bearing having a plurality of sockets entering the race way, pins each provided with a recess and each having a spring lodged in it with the pins adapted to be received in the sockets, and members, one in each recess in position to engage the shaft within the passage in the journal bearing for the shaft, the recesses in the pins being so arranged with relation to the shaft as to cause the members in the recesses to clutch the shaft when the latter is rotated in one direction and to free the shaft when the latter is rotated in the other direction, said members in the recesses being of a number and so disposed about the shaft as to constitute a friction reducing bearing for the shaft when the latter is rotated in a direction opposite to that causing the clutching of the shaft in the journal bearing.

3. In a brake mechanism, the combination with a shaft, of a journal bearing having a passage for the shaft with a race way surrounding and concentric with said passage and said shaft being provided with a circumferential groove matching the race way, a circular series of pins in the journal bearing in tangential relation to and intersecting the race way, each pin having an elongated recess where intersecting the race way, rotatable members lodged one in each recess and the portion of the race way matching the recess, and a spring in each pin engaging a respective one of the rotatable members to move the latter lengthwise of the recesses and the recess in each pin being so related to the race way as to reduce the radial depth of the latter in the direction in which the spring urges the rotatable member and said pins and rotatable members being in number and so disposed about the shaft as to provide a friction reducing bearing for the shaft for one way rotation thereof.

4. In a brake mechanism, the combination with a shaft, of a journal bearing having a passage for the shaft with a race way surrounding and concentric with said passage and said shaft being provided with a circumferential groove matching the race way, a circular series of pins in the journal bearing in tangential relation to and intersecting the race way, each pin having an elongated recess where it intersects the race way, a rotatable member lodged in each recess and the portion of the race way matching the recess, and a spring in each pin engaging the rotatable member to move the latter lengthwise of the recess, said recess in each pin being so related to the race way as to reduce the radial depth of the latter in the direction in which the spring urges the rotatable member, and said pins and rotatable members being in number and so disposed about the shaft as to provide a friction reducing bearing for the shaft for one way rotation thereof, each pin having a longitudinal bore for receiving the spring with the outer end of the bore threaded, and a screw inserted in the threaded end of the bore to retain the spring in place.

5. In a brake mechanism, the combination with a shaft, of a journal bearing having a passage for the shaft with a race way surrounding and concentric with said passage and said shaft being provided with a circumferential groove matching the race way, a circular series of pins in the journal bearing in tangential relation to and intersecting the race way, each pin having an elongated recess where it intersects the race way, a rotatable member lodged in each recess and the portion of the race way matching the recess, and a spring in each pin engaging the rotatable member to move the latter lengthwise of the recess, said recess in each pin being so related to the race way as to reduce the radial depth of the latter in the direction in which the spring urges the rotatable member and said pins and rotatable members being in number and so disposed about the shaft as to provide a friction reducing bearing for the shaft for one way rotation thereof, each pin having a longitudinal bore for receiving the spring with the outer end of the bore threaded, and a screw inserted in the threaded end of the bore to retain the spring in place, said screw having an axially extended stem for centering the spring in the bore.

6. In a brake mechanism, the combination with a shaft, of a journal bearing therefor having a circular series of friction reducing elements engaging the shaft to constitute a friction reducing bearing therefor, with means in the journal bearing for causing the friction reducing elements to cramp the shaft when rotated in one direction and to free said elements from cramping relation to the shaft when the latter is rotated in the other direction, said friction reducing elements and the means controlling them being in number and disposition about the shaft such as to wholly support the latter in either direction of rotation.

In testimony that I claim the foregoing as my own, I have hereto affixed my signature in the presence of two witnesses.

JOE HRIBAR.

Witnesses:
ETHEL M. GARTLEY,
MARTIN C. DECKER.